April 28, 1953　　　F. M. LITTELL ET AL　　　2,636,693
HYDRAULIC REEL
Filed March 26, 1947　　　　　　　　　　　　6 Sheets-Sheet 1
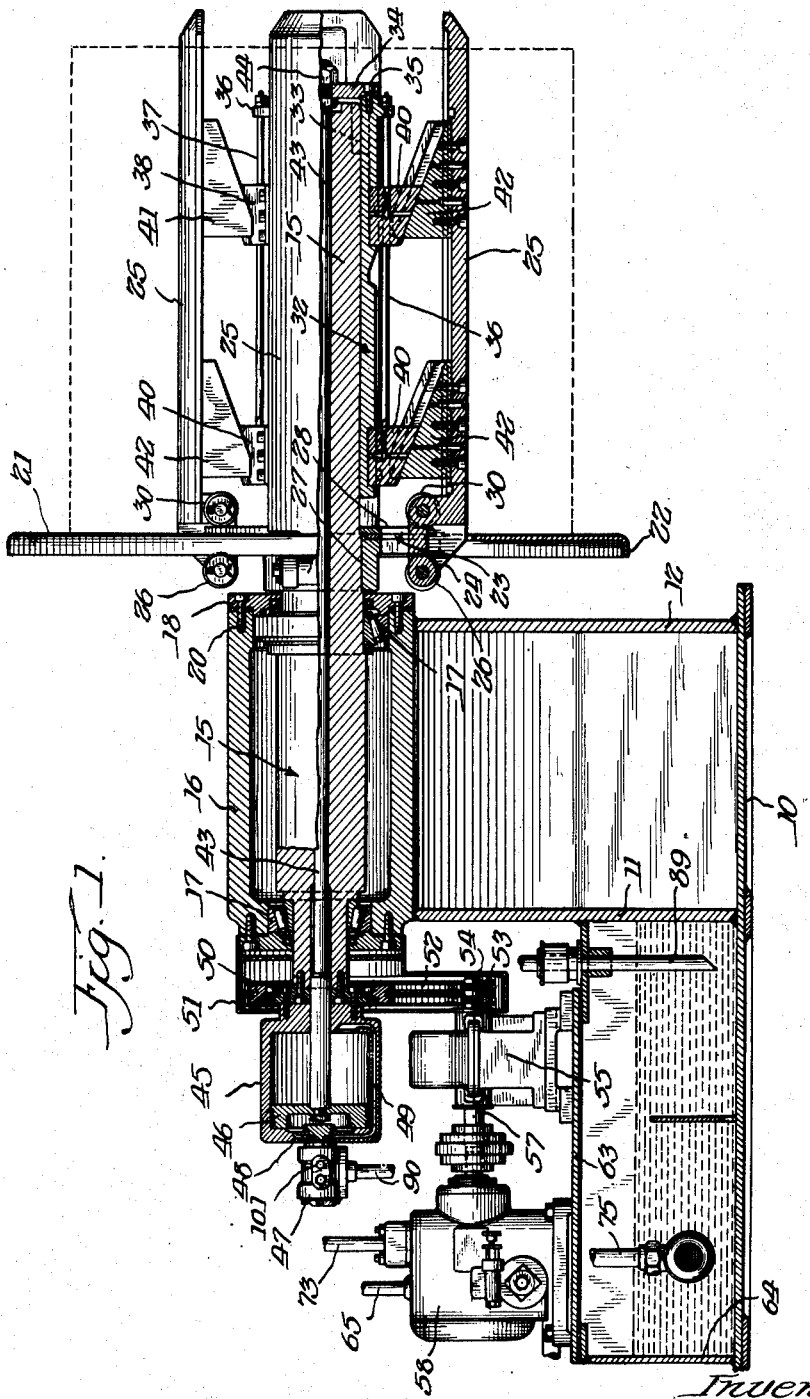
Inventors.
Frederick M. Littell &
Rudolph A. Skriba.
By Wilkinson Huxley Byron & Knight
Attys.

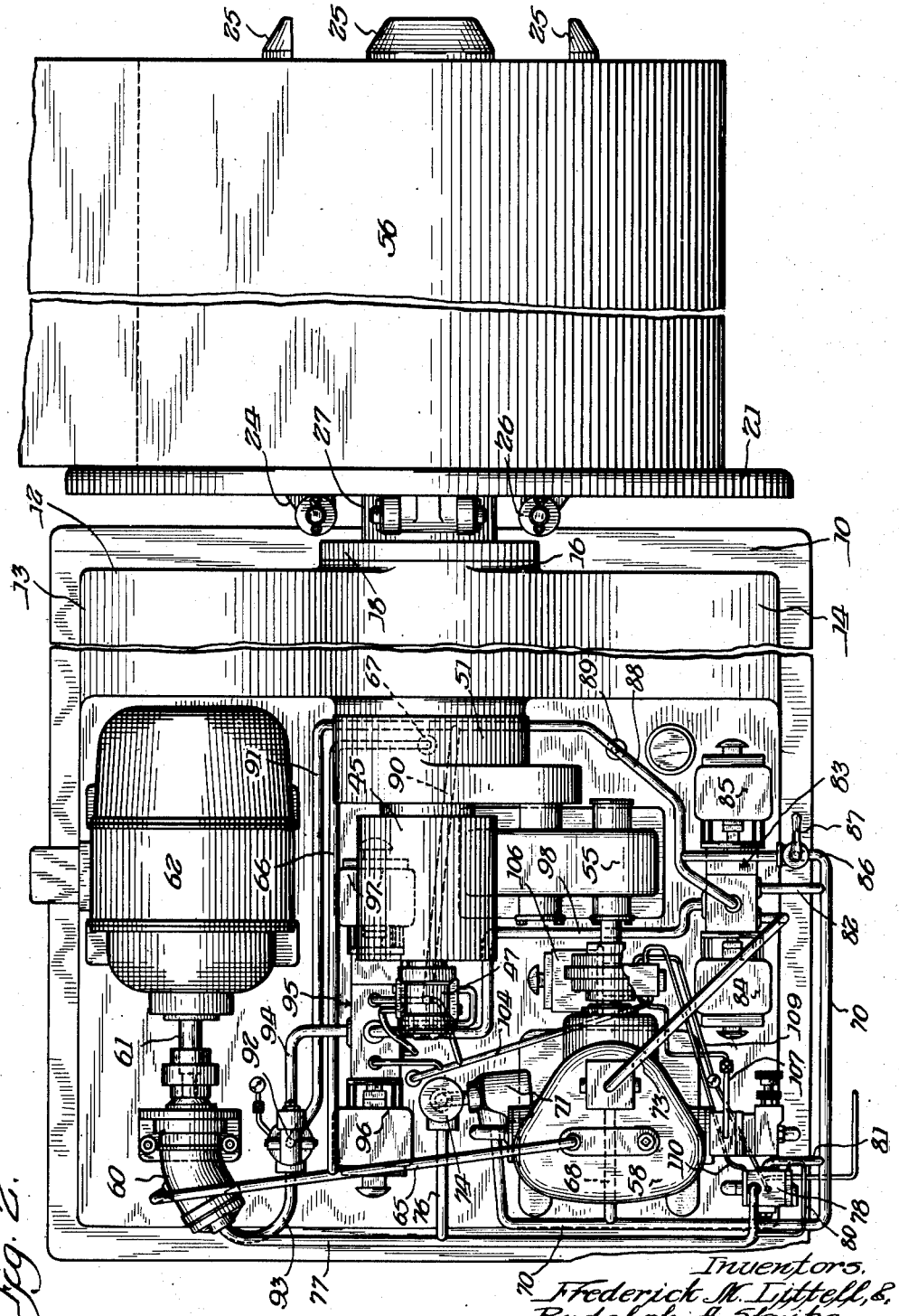

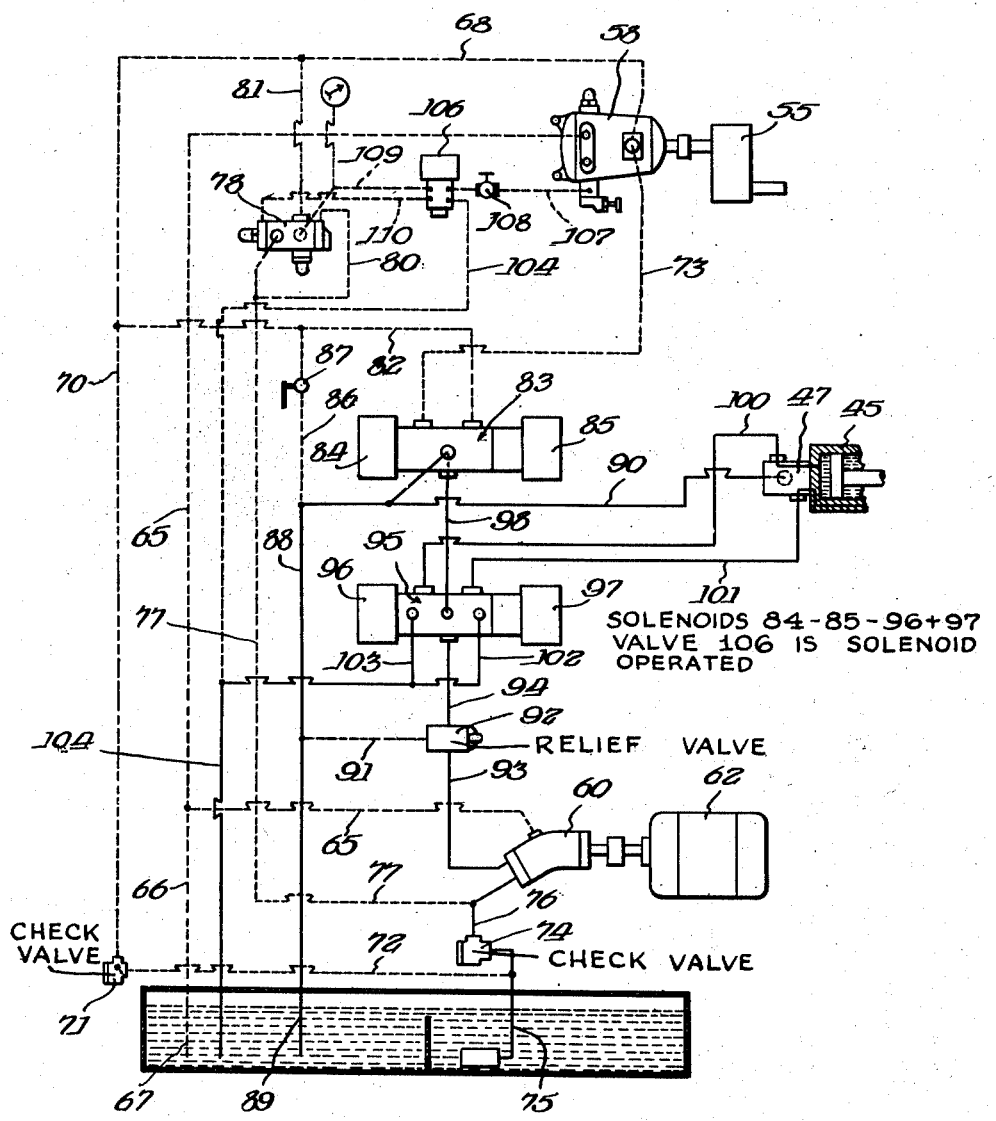

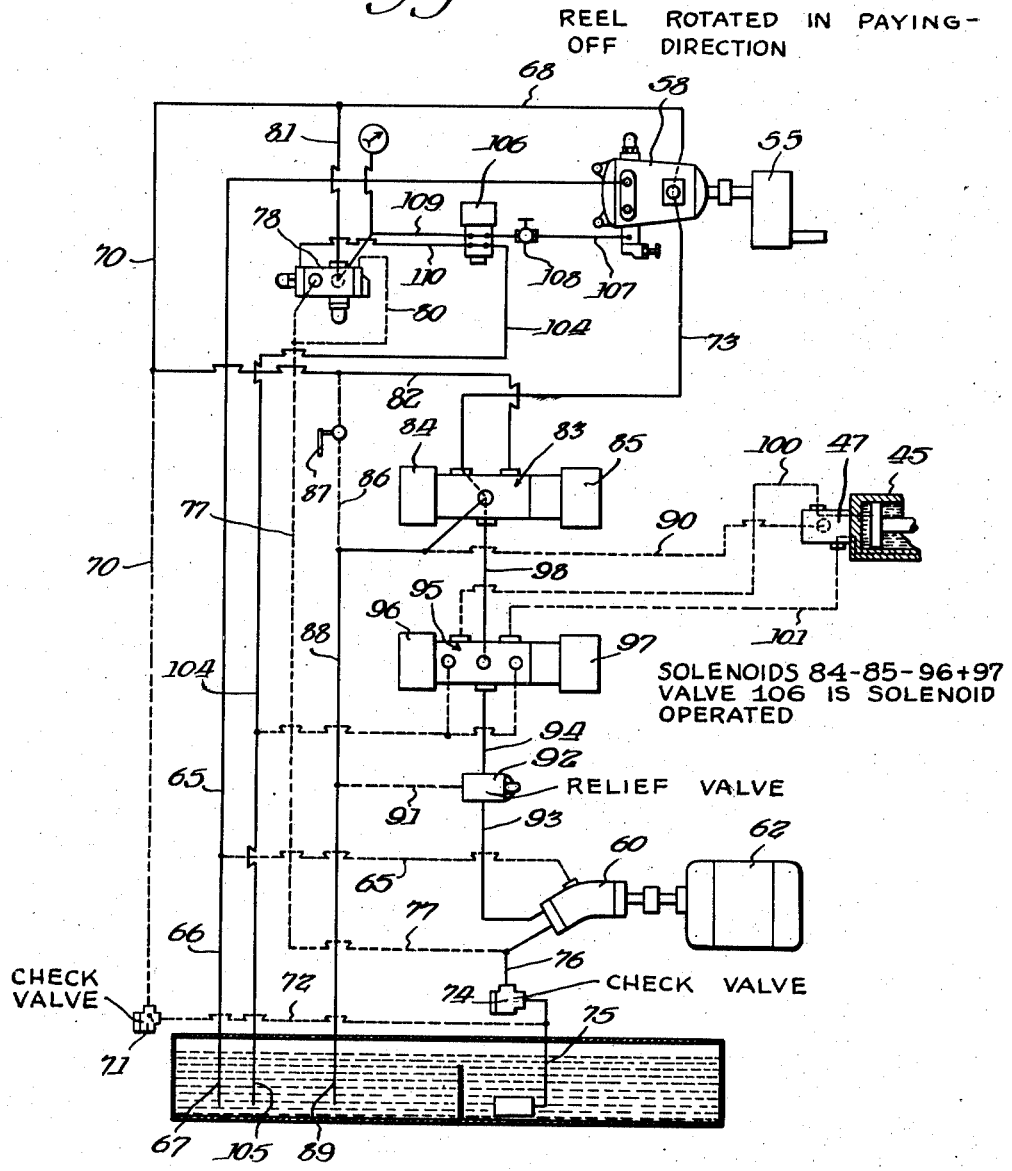

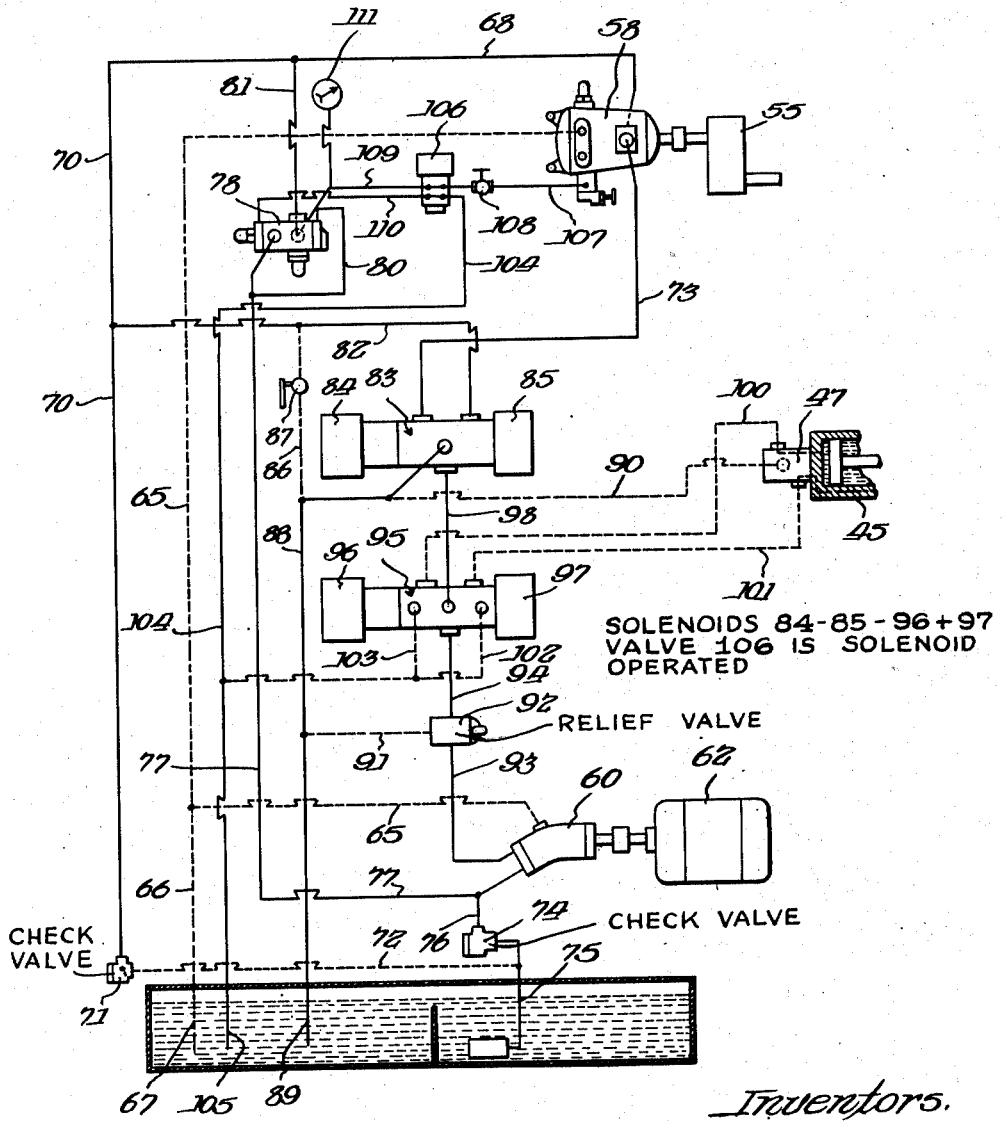

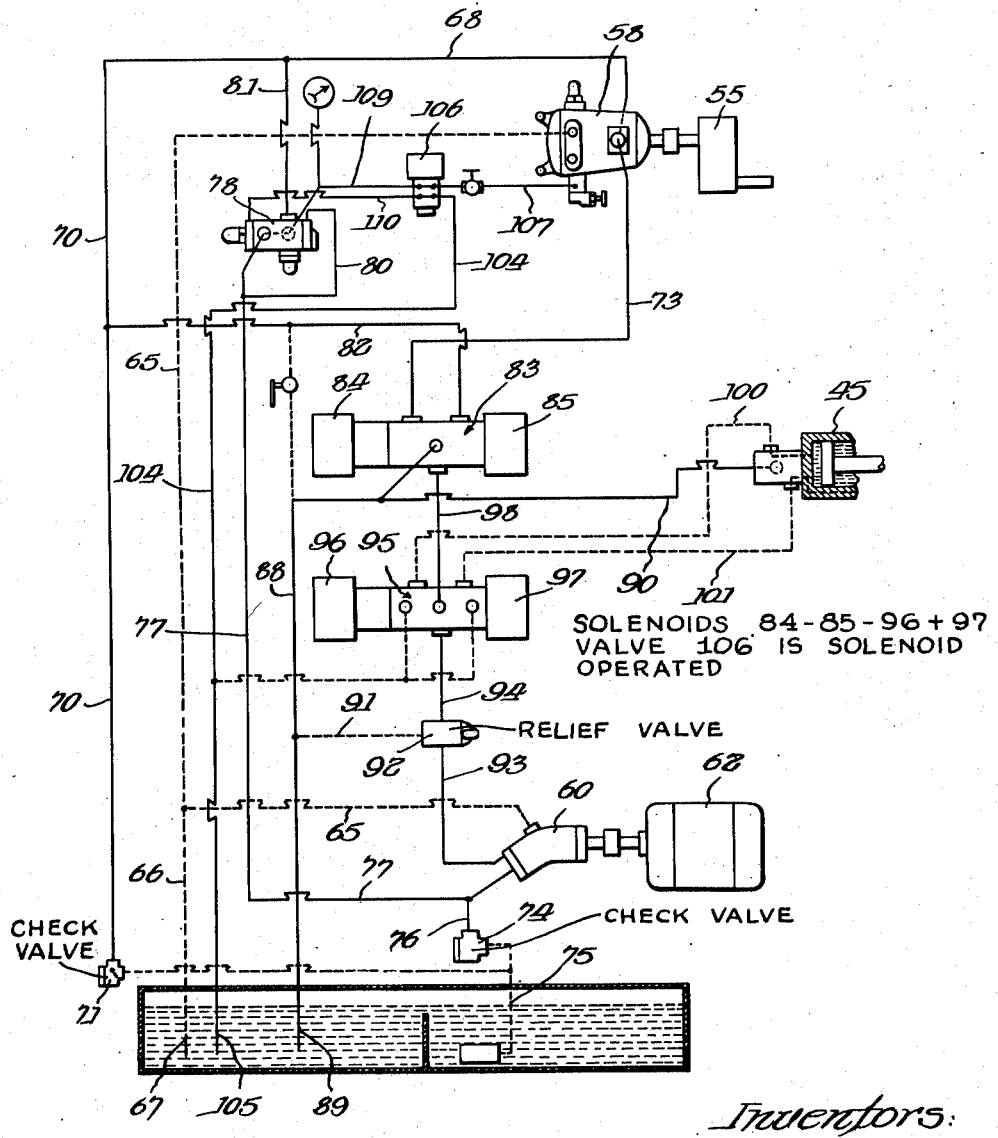

Patented Apr. 28, 1953

2,636,693

UNITED STATES PATENT OFFICE 2,636,693

HYDRAULIC REEL

Frederick M. Littell, Detroit, Mich., and Rudolph A. Skriba, Chicago, Ill., assignors to F. J. Littell Machine Company, Chicago, Ill., a corporation of Illinois Application March 26, 1947, Serial No. 737,366

4 Claims. (Cl. 242—78)

The invention relates to reels for strip material in coil form and has more particular reference to a reel of the centering type having a plurality of reel supporting arms movable radially outward or inward to grip or release a coil supported thereby and to an improved system employing an electric motor operating through hydraulic means for driving said reel in a winding or unwinding direction and which said hydraulic means will apply a braking action to the reel when the material is being withdrawn from the same to maintain the desired tension on the material.

For illustrative purposes a spindle reel of the centering type has been selected, the same having horizontally supported arms mounted for movement in a radial direction with respect to the spindle whereby a coil of metal stock may be securely gripped by expanding movement of the arms and may be released when the arms are moved in a contracting direction, and in this connection the invention has for an object the provision of improved hydraulic mechanism for driving the reel and for applying a braking action when the reel is caused to rotate in a paying-off direction.

Another object resides in the provision of a spindle reel having horizontal coil supporting arms and hydraulic means for actuating the arms, and which said hydraulic means will also produce rotation of the reel in either direction for winding metal strip material onto the coil or unwinding the same, as when the metal strip is fed to a machine for processing the same.

Another object of the invention resides in the provision of hydraulic drive mechanism for rotating the spindle of a reel such as described, and which mechanism will operate the coil supporting arms, holding them in expanded position by locking the hydraulic medium on both ends of the pressure cylinder, and which will also apply driving power to the spindle for rotating the coil supported by the arms, said power means being continuously coupled and available at all times.

Another object of the invention is to provide improved hydraulic drive mechanism for a spindle reel as described and which will consist of fluid driving and fluid driven elements operating in a manner to apply a braking action to the reel during rotation thereof in a paying-off direction.

A further object of the invention is to provide hydraulic drive mechanism for a coil unwinding or paying-off device which will apply a brake or drag to the strip material unwinding from the coil to maintain the same under tension, the said drag or tension being substantially constant notwithstanding the size of the coil and its speed of rotation since regenerative braking is effected by an electric motor driven through the hydraulic drive means.

With these and various other objects in view, the invention may consist of certain novel features of construction and operation as will be more fully described and particularly pointed out in the specification, drawings and claims appended hereto.

In the drawings, which illustrate an embodiment of the invention, and wherein like reference characters are used to designate like parts—

Figure 1 is a vertical, longitudinal section view of a reel embodying the improvements of the invention and which is shown in driving relation with an electric motor through hydraulic mechanism also coming within the invention;

Figure 2 is a top plan view of the improved hydraulic reel shown in Figure 1, the figure more particularly illustrating the fluid driving and fluid driven elements and associated controlling means of the hydraulic mechanism;

Figure 3 is a schematic flow diagram of the hydraulic mechanism of the invention and which more particularly illustrates the flow of the hydraulic fluid for expanding the arms of the reel;

Figure 4 is a schematic flow diagram of the hydraulic mechanism of the invention illustrating the flow of the hydraulic fluid for rotating the reel in a forward or paying-off direction;

Figure 5 is a schematic flow diagram of the hydraulic mechanism of the invention illustrating the flow of the hydraulic fluid for hydraulic braking at slow speeds before regeneration takes place; and Figure 6 is a schematic flow diagram of the hydraulic mechanism of the invention illustrating the flow of the hydraulic fluid for regenerative braking, whereby electrical energy is returned to the power lines.

The reel selected for illustrating the present invention is similar in many respects to that shown and described in the patent to Frederick M. Littell No. 2,270,064, granted January 13, 1942. Basically both reels employ a plurality of coil supporting arms having association with a circular plate which mounts the arms for radial movement either toward or from the spindle shaft of the reel, the shaft being journalled for rotation on a horizontal axis. The present invention provides an electric motor for driving the reel through hydraulic mechanism of improved design and which is capable of performing several distinct functions. For example, power is supplied by said mechanism in the form of a pressure fluid for contracting or expanding the arms and for also rotating the shaft in an unwinding or winding direction with inching control. Another function of the hydraulic mechanism is to apply a braking action or drag to the reel as it rotates in an unwinding direction to maintain the strip material under tension, and although the speed of rotation of the spindle shaft may vary the hydraulic mechanism of the invention will operate to maintain the said braking action or drag substantially constant.

Referring to Figure 1, the spindle reel essentially consists of a base 10 having end members 11 and 12 and side members 13 and 14 providing supporting means for the spindle shaft 15. The side members 13 and 14 slope diagonally, being directed toward each other, and at their apex said members together with 11 and 12 support the housing 16 of cylindrical form and which is disposed horizontally. At its respective ends the housing is provided with the roller bearings 17 for journalling the spindle shaft 15, which shaft projects from the respective ends of said housing. The forward projecting end of the spindle shaft has the various elements for supporting the coil associated therewith, whereas, the rear projecting end of the shaft is associated with hydraulic driving means for operating the reel.

The spindle shaft is mounted within housing 16 by being inserted from the forward end of the supporting structure or standard since it will be observed that this end of the housing is closed by the face plate 18 which is secured in place by screws 20. The forward projecting end of the spindle shaft carries the circular plate 21 which is suitably secured to the shaft immediately adjacent face plate 19. Said plate, which is of fairly large diameter, is flanged as at 22 and has a plurality of slots 23 extending radially of the plate and spaced around the central hub of the same. The slots 23 receive the rear portion 24 of the coil supporting arms, indicated in their entirety by 25, and said slots confine the arms for movement in a radial direction. This radial movement of the arms when in an outward direction expands the arms for the purpose of gripping the central opening of a coil of metal stock or the like whereby the coil is securely held and thus supported by the arms. When the radial movement is in an inward direction the coil is released and the same may be removed, or, if the reel is empty, a coil may be located thereon. The rollers 26, journalled at the rear of portion 24, have rolling contact with the flange part of hub member 27 to which the plate 21 is secured and by means of which the plate is fixed to the spindle shaft 15 so as to rotate therewith. The said flange part of hub member 27 is provided with a plurality of radially extending slots which coincide with 23 so that the rear portion 24 of the respective arms extends through the aligned openings thus formed. An additional plate 29 is fixed to circular plate 21 on the front surface thereof adjacent hub 27 and this front plate is likewise apertured to provide a plurality of radial aligned openings. Rollers 30, similar to 26, are also carried by the portion 24 of the arms, and these rollers have contact with the face of plate 29. The reel shown in the drawings is provided with four coil supporting arms and each arm is operatively connected with an axially movable sleeve, which structure will now be described.

The sleeve 32 is tubular, having an internal diameter so as to telescope the forward end of the spindle shaft 15, and said sleeve is accordingly mounted for axial movement on the shaft. This movement is permitted by the key 33 which has the additional function of uniting the sleeve in a non-rotatable manner to the shaft. The forward end of sleeve 32 is provided with a cover plate 34 being secured to the sleeve by the screws 35. Adjacent this connection between the cover plate and the sleeve, the sleeve is formed with an annular rim 36 which functions as the front anchoring means for a plurality of longitudinally extending tubes 37. The tubes extend through the fixed slides 38 and 40 and they constitute means for oiling or greasing the diagonal surfaces of the slides since the tubes are in effect capillary members and provision is made for the release of the oil or grease from the tubes at their connection with the slides respectively. The arms 25 are each provided with slides 41 and 42, being fixed thereto in spaced relation, the slides 41 having interlocking relation with their respective slide 38, whereas slides 42 have interlocking relation with their respective slide 40. The interlocking of the slides at their diagonal surfaces functions to retain the arms to the sleeve 32 and to additionally provide for radial movement of the arms upon axial movement of the sleeve.

Movement is imparted to sleeve 32 by the operating rod 43 which extends through the spindle shaft 15 centrally thereof and projects from either end of the shaft. The forward projecting end of rod 43 is fastened by the nut 44 to the cover plate 34 which in effect connects the operating rod with sleeve 32 so that upon longitudinal movement of the rod similar movement is imparted to the sleeve and as a result of the slides and their diagonal interlocking surfaces the arms 25 are caused to move radially of the circular plate 21.

Rod 43 extends rearwardly into the pressure cylinder 45 suitably secured to the rear end of the spindle shaft 15, forming a rear extension of the shaft and which rotates therewith. The piston 46 is fixed to rod 43 and said piston reciprocates within pressure cylinder 45 to effect longitudinal movement of rod 43. The distributor 47 is stationary and does not rotate with cylinder 45 although the same is associated therewith for supplying pressure fluid to the respective ends of the cylinder, the distributor having connection with various supply pipes for the hydraulic fluid as will be more particularly described in connection with the hydraulic mechanism of the invention. When fluid under pressure is supplied by the distributor to the passage 48 the said fluid is admitted to the rear of the cylinder in front of piston 46 and the piston is caused to move forwardly or in a direction toward the right, Figure 1, producing similar movement of rod 43 and sleeve 32 which collapses the arms 25. When the pressure medium from distributor 47 is supplied to passage 49 the same is admitted thereby to the front end of the cylinder, and the piston is caused to move in a direction toward the left. This movement is imparted to rod 43 and thus to the sleeve which has the effect of causing expansion of the arms 25. The spindle shaft carries a double sprocket wheel 50, the same being suitably secured to the shaft at the connection therewith of the cylinder 45, and the said sprocket is suitably enclosed by housing 51. An endless chain 52 operatively connects sprocket 50 with the sprockets 53 of smaller size and which are fixed to shaft 54 of the speed reducing mechanism generally indicated by numeral 55. When the spindle is rotated by the paying-off action of the strip material from coil 56, Figure 2, the rotation is transmitted through the endless chain 52 to shaft 54, which thus constitutes the input shaft of the speed reducing mechanism, with the other shaft 57 comprising the output shaft and which is suitably coupled to the fluid pump 58. However, the pump 58 is operated as a fluid motor when it is desired to drive the spindle shaft and rotate the coil supported thereby. In such case shaft 57 constitutes the input shaft and 54 the output shaft. The element 58 is therefore a fluid pressure energy translating device which may operate either as a motor or as a pump of the variable displacement type, being equipped with a compensator for pumping a constant volume although its speed may vary. Said device 58 is manufactured by Vickers Incorporated of Detroit, Michigan, under United States Patents Nos. 2,248,076 and 2,277,570.

The hydraulic mechanism of the invention also includes another fluid pressure energy translating device, identified by numeral 60, having its operating shaft suitably coupled to shaft 61 of the electric motor 62, said motor comprising the source of power for driving the reel and actuating the arms of the same. The fluid pressure device is of the fixed displacement type, and when the same operates as a pump its delivery comprises a fixed volume of liquid and when operating as a fluid motor it will have varying speed depending on the volume of liquid delivered to it by energy translating device 58. The two fluid pressure energy translating devices, namely, 58 and 60, are connected by a series of conduits for transmitting the hydraulic fluid to the same and for conducting the said fluid therefrom, and in accordance with the invention certain control means have been provided whereby the function of the devices either as fluid driving or fluid driven elements is determined. This mechanism will now be described.

The various conduits for the pressure fluid and controls therefor are shown in Figure 2 as they are actually assembled and connected to each other, being supported by platform 63 located above base 10 and which platform forms the cover for the sump or reservoir provided by base 10, side wall 11, and other side walls 64 suitably welded together to form a liquid-tight container. It will be seen that the speed reducing mechanism 55 and the fluid pressure device 58 are suitably supported by cover 63 of the reservoir. In a similar manner device 60 and the electric motor 62 are also supported by the cover. The hydraulic mechanism is thus conveniently located directly over the reservoir and rearwardly of the reel adjacent the pressure cylinder 45.

Starting with device 58, it will be seen that the same is connected by pipe 65 with device 60, said pipe 65 having an intermediate connecting pipe 66 which leads to the drain 67. Another pipe 68 leads from the underside of device 58, having connection with pipe 70 which extends in one direction to connect with a check valve 71 having connection by pipe 72, Figure 3, to a second check valve 74. Valve 74 is provided with the suction pipe 75 and with a connecting pipe 76 which joins the conduit 77 which connects device 60 with a control element identified by numeral 78. The control element 78 is provided with a spring for maintaining its inlet valve closed and which spring is adjustable for purposes to be presently described. The control element is also provided with an auxiliary conduit 80 of small diameter, which also connects with conduit 77. Referring again to pipe 70, it will be seen that a branch pipe 81 connects the same to control element 78 and that a second branch pipe 82 connects 70 with the solenoid operated valve means 83, the same comprising a four-way valve member actuated in one direction by solenoid 84 and by solenoid 85 in an opposite direction. The by-pass conduit 86 is provided with the manually actuated globe valve 87 and this by-pass conduit joins with pipe 88, having connection at one end with the valve means 83 and also connecting with the drain 89 leading to the reservoir. Pipe 88 has connection with pipe 90 which leads to the underside of distributor 47 to function as a drain to conduct surplus liquid to the reservoir. Pipe 88 has connection by means of pipe 91 with the relief valve 92, the valve having location relatively adjacent device 60 and connecting with device 60 by means of pipe 93. A third pipe 94 leads from relief valve 92 and this connects the valve with valve means generally indicated by numeral 95. Said valve means is of the solenoid operated type similar to 83, comprising a four-way valve member which is actuated in one direction by solenoid 96 and in an opposite direction by solenoid 97. The valve means 83 and 95 are connected by pipe 98. Energization of solenoids 96 and 97 of the valve means 95 controls the admission of pressure fluid to the pipes 100 and 101 which connect said valve means with distributor 47. When solenoid 96 is energized the pressure medium is admitted to pipe 100 to collapse the arms and when solenoid 97 is energized the pressure medium is admitted to pipe 101 to expand the arms. The pipes 102 and 103 comprise drains for the valve means 95 and these in turn connect with pipe 104 which leads to a drain 105 at one end and connects at its opposite end with the control member 106. Said control member 106 is a solenoid operated valve and it controls flow of the pressure fluid through control element 78. Said member 106 has four pipes connecting therewith, of which 104 constitutes one. Pipe 107, having the needle valve 108, connects the control member with the device 58. Pipes 109 and 110 connect the control member with the element 78. 111 indicates a pressure gauge which is tapped on pipe 109.

In the schematic flow diagram of Figure 3 the pipes of the hydraulic mechanism which are operative for expanding the arms of the reel, are shown in full lines and the remaining pipes which are not required for this operation have been shown in dotted lines. It will be understood that upon operation of motor 62 the device 60 will be driven as a pump and liquid will be withdrawn from the sump through the suction pipe 75 and delivered through pipe 93 to the relief valve 92, through the relief valve and by pipe 94 to the valve means 95. For expanding the arms solenoid 97 is energized with the result that pipe 101 carries the pressure fluid to the right end of the cylinder 45 and to the rear of the piston, causing movement of the same in a direction to the left to expand the arms 25 of the reel in a manner as has been described. The liquid returning from the cylinder 45 is delivered by pipe 100 to valve means 95 which delivers this liquid to pipe 98, connecting with the valve means 83. Both solenoids 84 and 85 of said valve means are de-energized and thus the same is caused to deliver this liquid to pipe 88 which eventually returns it to the reservoir through drain 89. For collapsing the arms pump 60 operates in a similar manner to deliver fluid under pressure to valve means 95 and with solenoid 96 energized for collapsing the arms the pressure fluid is delivered to pipe 100 and is admitted to the left hand end of the cylinder 45 in front of the piston, causing movement of the piston and associated parts in a direction to collapse the arms. Pipe 101 takes care of the returning fluid which is caused to flow through pipe 98 to valve means 83 and by said means to pipe 88 by means of which it is returned to the reservoir.

The elements of the hydraulic mechanism are repeated in Figure 4 but in this figure the flow diagram indicates by full lines those pipes which are operative for producing an unwinding action of the reel, or, in other words, rotation of the spindle shaft 15 in a paying-off direction. For this purpose solenoid 85 of the valve means 83 is energized. Solenoids 96 and 97 of valve means 95 remain de-energized and as a result pipes 100 and 101 are locked so as to hold the piston in left hand position as shown within cylinder 45 whereby the arms are held expanded. The pressure medium flows through the valve means 95 and into 83 where it is directed by energization of solenoid 85 to pipe 73 and thus to the fluid motor 58 which is caused to drive the spindle shaft of the reel in a paying-off direction. The return from the motor 58 is delivered by pipes 68 and 70 to 82 and by the valve means 83 to pipe 88 which delivers the returning fluid to the reservoir through drain 89. During this operation some returning fluid from 68 is delivered by 81 to the control element 78 and from the control element is delivered to pipe 109 and by control member 106 to pipe 107 and thus to the fluid motor 58. Said device is at all times connected with a drain which is indicated by pipe 65 having connection with 66 and thus with drain 67. For causing rotation of the spindle shaft in a reverse direction, or, in other words, for winding up the strip material on the coil, the solenoids 96 and 97 remain de-energized and 84 is now energized along with control member 106. Pipes 100 and 101 remain locked and by the action of solenoid 84 the pressure fluid is delivered to pipe 82, pipe 70 and by pipe 68 to the motor 58 which is thus driven in the reverse direction for winding material onto the coil. The return from the motor is conducted through pipe 73 to valve means 83 and thus to pipe 88 and drain 89.

In Figure 5 the full lines indicate the operative pipes of the hydraulic mechanism for effecting plain or hydraulic braking before regeneration takes place. In this case it will be understood that the strip material is being drawn from the reel and this operation produces rotation of the spindle shaft 15 and driving of the device 58 which operates as a fluid pump. Even though the linear speed of the material being removed from the coil may be constant, the speed of rotation of the spindle shaft will vary, and, in those instances where plain braking is produced by the hydraulic mechanism the speed is below that critical speed which has the effect of causing regenerative braking. The device 58 is driven in a direction to supply a pressure fluid to pipe 68, a portion of which flows through pipe 70 into pipe 82. The pressure fluid in pipe 70 flowing in this direction will automatically close check valve 71 so that the fluid is delivered to valve means 83. The solenoids 84 and 85 of said valve means remain de-energized and the position of the four-way valve member is such as to direct the fluid back to device 58 through pipe 73. Since said pipe 73 constitutes the suction for the pump 58 additional fluid is drawn from pipes 88 and 98. Some of the pressure fluid flowing through pipe 68 is diverted by pipe 81 to the control element 78 and this element is provided with a relief spring normally holding its valve closed against the pressure of fluid in pipe 81. However, the said spring is adjustable so that device 58 when operating as a pump may be caused to work against the desired pressure merely by adjusting element 78. The pipe 77 leading from 78 acts as a drain to return some of the liquid to device 60. Since the liquid in pipe 77 will be under some pressure the valve 74 is thus closed to deliver all the liquid to 60. Pipes 110 and 104 also function as drain pipes for the valve element 78. The liquid returned to device 60 is acted on by the same, which is still operating as a pump so that the liquid is delivered to pipe 93 and from pipe 94 it flows through the valve means 95 to 98 which completes its circuit.

Plain braking is thus produced by the hydraulic mechanism of the invention by causing device 58 to work against pressure when operating as a pump. When the speed of rotation of the coil is below critical speed, pressure will be maintained on the device 58 by control element 78, although it will be understood that the spring tension on the valve in element 78 is adjustable, which has the effect of adjusting the intensity of such braking as produced by the mechanism. Regenerative braking takes place automatically with increase in speed of rotation of the spindle shaft 15 to a speed above critical speed. In such cases the output of pump 58 is of sufficient volume to force the control valve in element 78 wide open and substantially full pump pressure is delivered through pipe 77 to device 60 which is caused to operate as a fluid motor, driving the electric motor 62 as a generator and returning electrical energy to the power lines.

To accomplish the above objectives, the device 58 is provided with a compensator so that the volume of liquid pumped by 58 remains approximately constant although its speed may within limits vary. The constant volume of liquid thus delivered by 58 to the fluid motor 60 causes the electric motor 62 operating as a generator to develop constant power which maintains a constant tension on the strip material being drawn from the reel.

The compensator is an important element of the device 58 since the speed of the strip material uncoiling from the reel or the size of the coil may cause a change in the rotary speed of the spindle shaft. Since said device is being driven from the spindle shaft through the speed reducing mechanism 55, which in this direction functions as a speed increasing mechanism, the speed of device 58 may at times be considerable and the volume of liquid pumped by the same would be excessive for regenerative purposes. Therefore the compensator varies the piston displacement of the said fluid energy translating device 58 and which is brought about by the liquid in pipe 107 shifting the compensator. However, when the variations of the compensator are limited to a reasonable range as measured by certain minimum and maximum speeds of the device 58 its operation as a pump is then completely satisfactory and within the limits it is possible to maintain a substantially constant delivery. The compensator can be adjusted so that the device within a predetermined range of speeds can be made to deliver and remain substantially constant at the volume desired.

Referring to Figure 6, the full lines in this figure indicate the operative pipes or conduits of the hydraulic mechanism during regenerative braking. The device 58 is of course driven as a pump and fluid pressure is delivered to pipe 68 with some of the liquid entering pipe 70 and pipe 82 which delivers the fluid to valve means 83. The position of the four-way valve member of said means, with both solenoids being de-energized, is such as to direct the liquid into pipe 73 constituting the suction side of the pump 58. Suction pipe 73 also draws additional liquid from pipes 88 and 98. Most of the liquid under pressure from pipe 68 is directed through pipe 81 to the control element 78 and said pressure is sufficiently great to force the valve of 78 wide open, delivering said pressure fluid to pipe 77 and which conducts the same to device 60. As a result device 60 operates as a fluid motor. The speed of pump 58 has reached a point where the output volume of the pump is greater than the displacement of motor 60. The pipes 68, 81 and 77 are therefore under pressure which effects closing of valve member 74 and since more liquid is delivered by line 77 than the displacement of motor 60 can handle, the motor has a tendency to operate at a speed higher than the synchronous speed of motor 62. Such operation causes motor 62 to function as a generator and to deliver current to the power lines connecting therewith. Therefore at constant strip speed of the material being drawn from the reel a uniform drag or tension is maintained on the material as a result of the absorption of power by the generator which is constant. This is necessarily so since the fluid motor 60 has a fixed displacement and as long as a surplus supply of liquid under a uniform pressure is delivered to the fluid motor its horse power output will be constant.

During regenerative braking some excess fluid is delivered by control element 78 to line 109 and thus to 107 for return to pump 58. Also line 110 acts as a drain and since the same connects with 104 this liquid is returned to the reservoir.

What is claimed is:

1. In a reel, in combination, a spindle shaft journalled by supporting means and positioned to provide a projecting reel portion, a coil supporting reel on the projecting portion including a plurality of coil supporting arms adapted to support a coil of strip material, hydraulic mechanism for driving said spindle shaft to cause rotation of the reel and thus the coil to wind or unwind strip material therefrom, said hydraulic mechanism including an electric motor, a fluid energy translating device operatively connected to the motor, a second fluid energy translating device operatively connected to the spindle shaft, conducting means for a pressure fluid connecting said devices with each other and with a reservoir and including control means for controlling operation of the devices as fluid driving or as fluid driven elements, said hydraulic mechanism providing hydraulic braking of the spindle shaft when rotated below a critical speed as determined by the control means to thereby maintain adjustable tension on the strip material unwinding from the coil, and said hydraulic mechanism providing regenerative braking of the spindle shaft when rotated above said critical speed wherein the electric motor is driven as a generator to thereby maintain constant tension on the strip material unwinding from the coil.

2. In a reel, in combination, a spindle shaft journalled by supporting means and positioned to provide a projecting reel portion, a coil supporting reel on the projecting portion including a plurality of coil supporting arms adapted to support a coil of strip material, hydraulic mechanism for driving said spindle shaft to cause rotation of the reel and thus the coil to wind or unwind strip material therefrom, said hydraulic mechanism including an electric motor, a fluid energy translating device of the fixed displacement type connected to the motor, a second fluid energy translating device of the variable displacement type connected to the spindle shaft, conducting means for a pressure fluid connecting said devices with each other and with a reservoir and including control means for controlling operation of the devices as a fluid motor or as a fluid pump, one of said control means comprising an adjustable relief valve located in the conducting means on the output side of the second fluid energy translating device when operating as a pump, said second fluid energy translating device operating as a pump and discharging its output against the closing action of said relief valve when the spindle shaft is rotated below a critical speed as determined by the control means to thereby hydraulically brake the spindle shaft to maintain adjustable tension on the strip material unwinding from the coil, and said second fluid energy translating device operating as a pump and delivering a volume of fluid against the closing action of said relief valve sufficient to maintain the valve fully open when the spindle shaft is rotated above critical speed, whereby said volume of fluid is in excess of the displacement of the first mentioned fluid energy translating device and the electric motor is accordingly driven thereby at a speed above its synchronous speed to provide regenerative braking for maintaining a substantially constant tension on the strip material unwinding from the coil.

3. A reel as defined by claim 2 additionally including a compensator for the second fluid energy translating device which maintains its output as a fluid pump substantially constant at speeds above said critical speed.

4. In a reel, in combination, a spindle shaft journalled by supporting means and positioned to provide a projecting reel portion, a reel on said portion adapted to support a coil of strip material, means for driving the spindle shaft including an electric motor, an hydraulic element connected to the electric motor, a second hydraulic element connected to the spindle shaft, conducting means for a pressure fluid connecting the hydraulic elements with each other and with a reservoir, control means for controlling the flow of said pressure fluid in the conducting means, said spindle shaft operating as the driven instrumentality in one position of the control means wherein the hydraulic element and the second hydraulic element operate as a fluid pump and fluid motor respectively, and said spindle shaft when operating as the driving instrumentality in another position of the control means effecting operation of the hydraulic element as a fluid motor and the second hydraulic element as a fluid pump delivering to the fluid motor to drive the same, whereby the second hydraulic elements pumps against pressure to maintain tension on the strip material unwinding from the coil.

FREDERICK M. LITTELL.
RUDOLPH A. SKRIBA.

References Cited in the file of this patent

UNITED STATES PATENTS

| Number | Name | Date |
|---|---|---|
| 1,815,100 | Francis | July 21, 1931 |
| 2,117,640 | Wean et al. | May 17, 1938 |
| 2,164,600 | Tyler | July 4, 1939 |
| 2,202,563 | Mikaelson | May 28, 1940 |
| 2,236,971 | Iversen et al. | Apr. 1, 1941 |
| 2,275,963 | Herman et al. | Mar. 10, 1942 |
| 2,299,101 | MacChesney | Oct. 20, 1942 |
| 2,323,104 | Washam | June 29, 1943 |
| 2,394,505 | Schroeder | Feb. 5, 1946 |
| 2,427,248 | Backus | Sept. 9, 1947 |